United States Patent

[11] 3,619,808

[72] Inventors Gary David Tomkins
Cypress;
Donald Victor Smart, Redondo Beach, both of Calif.
[21] Appl. No. 52,407
[22] Filed July 6, 1970
[45] Patented Nov. 9, 1971
[73] Assignee Union Carbide Corporation
New York, N.Y.

[54] LASER HEAD COOLING SYSTEM
2 Claims, 3 Drawing Figs.

[52] U.S. Cl. ............................................ 331/94.5
[51] Int. Cl. ............................................ H01s 3/00

[50] Field of Search ............................................ 331/94.5

*Primary Examiner*—Ronald L. Wibert
*Assistant Examiner*—Conrad Clark
*Attorney*—Pastoriza & Kelly ABSTRACT: An improved laser head cooling system is provided by circulating a special liquid coolant which is substantially chemically inert to avoid contamination, is electrically nonconducting, and has a substantially greater optical coupling transmission characteristic than water. To prevent deterioration of the liquid coolant itself, the quartz envelope for the light pump in the laser head is especially designed to be substantially opaque to short ultraviolet radiation.

INVENTORS
GARY DAVID TOMPKINS
DONALD VICTOR SMART
BY Pastoriza & Kelly
ATTORNEYS ns.
LASER HEAD COOLING SYSTEM This invention relates generally to lasers and more particularly to an improved laser head cooling system.

BACKGROUND OF THE INVENTION

Conventionally, laser heads are cooled by circulating water through the head. Normally a filtering system is necessary in the circulation path to remove contaminates dissolved in the water. Even with such a filtering system, the water is still partially conductive and therefore it is also necessary to shield the light pump electrodes.

In an effort to overcome some of the foregoing problems, different cooling media have been proposed. While certain cooling liquids are known which are substantially chemically inert and thus would serve ideally in a laser head system, these media deteriorate rapidly under short ultraviolet radiation present in the laser head during a light-pumping operation. As a result, simple water circulation is still in wide use.

BRIEF DESCRIPTION OF THE PRESENT INVENTION

The present invention provides a laser head cooling system in which the disadvantages associated with water are wholly avoided. Further, the system enables a more compact laser head cavity configuration to be realized than has been possible with cooling systems heretofore used, provides for a greatly improved optical transmission coupling between the light pump lamp and laser material, and permits operation under extreme temperature variation.

In accord with the invention, a special coolant in the form of a fluorinated ether is utilized. This coolant has an optical coupling transmission characteristic substantially greater than water over the operating wave lengths of the laser material. Moreover, it has a much higher boiling point and lower freezing or pour point than water and is sufficiently chemically inert as to avoid the necessity of any type of filtering.

In order to prevent deterioration of the improved coolant by short ultraviolet radiation from the light pump lamp, a special envelope is provided for the lamp. This envelope is made up of a titanium-doped quart which is substantially opaque to short ultraviolet radiation. The coolant is thus protected and can operate effectively for long periods.

BRIEF DESCRIPTION OF THE DRAWINGS

A better understanding of the laser head cooling system will be had by referring to the accompanying drawings, in which.

DETAILED DESCRIPTION OF THE INVENTION

Figure 1:
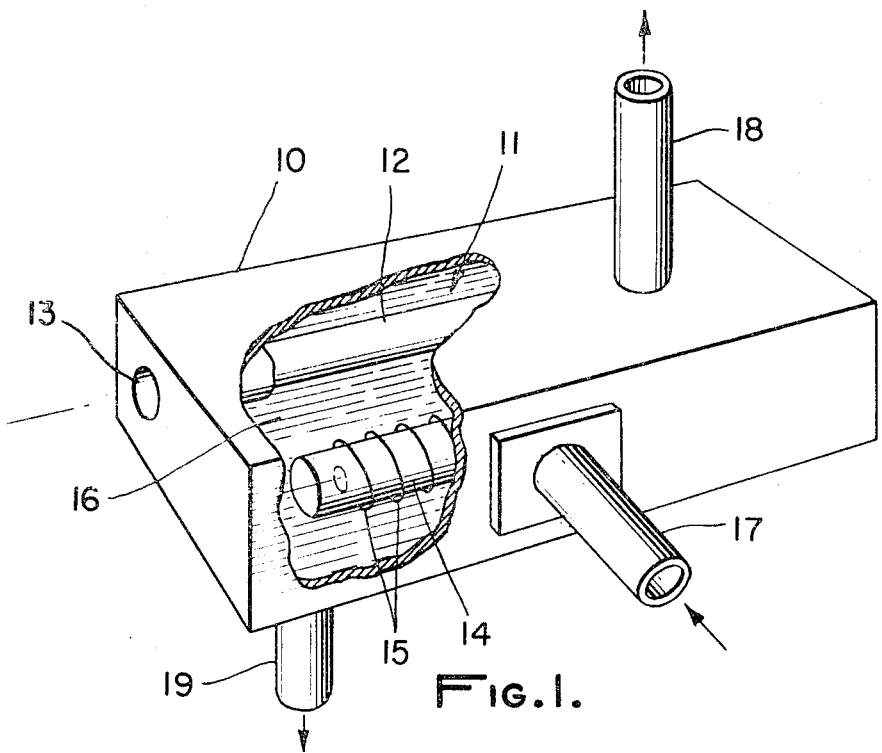
FIG. 1 is a cutaway perspective view of a typical laser head incorporating the improved cooling system of the present invention.

Referring first to FIG. 1 there is shown a laser head 10 having a hollow interior 11. As shown in the broken away portion, there is included a laser material such as a rod 12 supported in alignment with an outlet opening 13 for laser radiation. Also included in the hollow interior is a light pump lamp 14 provided with the usual electrostatic triggering windings 15.

In the particular configuration illustrated, the hollow interior portion of the laser head is elliptical in cross section, the laser rod 12 being disposed at one focus and the flash lamp 14 at the other focus. By this arrangement, maximum light coupling between the lamp and rod is attained.

Within the hollow interior there is illustrated a liquid coolant 16 which is circulated through the laser head by passing the same from an inlet passage 17 to suitable outlet passages 18 and 19. The coolant passing from the outlet passages may be recirculated to the inlet passage 17 by a pump (not shown).

In accord with the invention, the liquid coolant comprises a fluorinated ether which by way of example may be obtained from DuPont Laboratories under the name E-4. Equivalent liquid coolants are also available under the name E-3 and E-5.

The liquid coolant 16 has several desirable properties. Most important of these properties is its excellent optical coupling transmission characteristics as compared with water. Thus, with reference to FIG. 2, there is illustrated the transmission characteristics of water by the dashed line over wavelengths varying from 0.1 to approximately 1.2 microns. It will be noted that the transmission characteristic of water decreases markedly after about 0.8 microns. Thus for lasers operating at a wavelength of, for example, 1.06 microns there is a degradation in the optical coupling between the lamp and the laser rod as a consequence of the presence of the cooling water.

Figure 2:
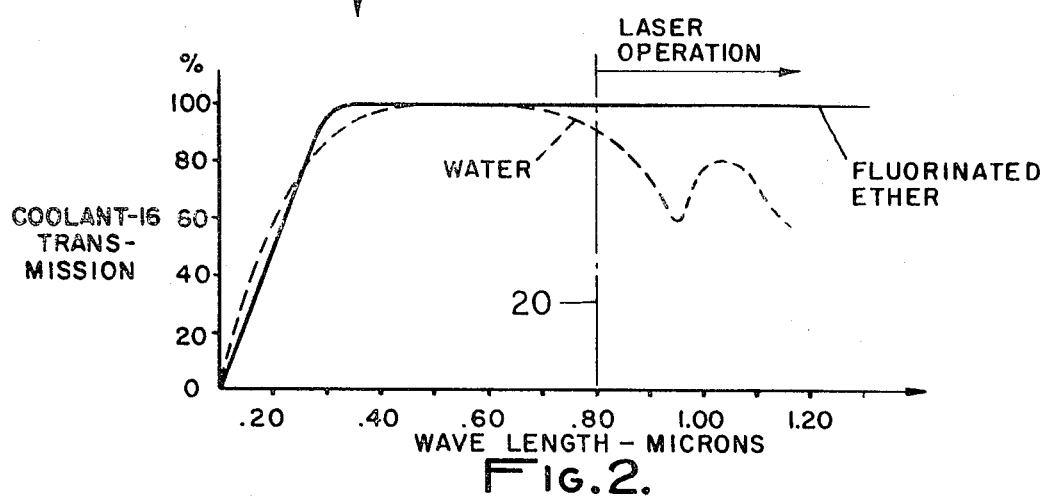
FIG. 2 is a plot of the transmission characteristic of the coolant utilized in the system of FIG. 1 compared to that of water; and, FIG. 3 is a plot of the transmission characteristics of the quart envelope for the light pump lamp of FIG. 1 as compared to conventional type quart envelopes.

For special liquid coolant in the form of the fluorinated ether, the transmission characteristic is depicted in FIG. 2 by the solid-line curve. It will be noted that the transmission is substantially 100 percent over the same wavelength band and that no degradation occurs above 0.8 microns wavelength; that is, beyond the vertical dashed line 20 in FIG. 2.

In addition to the foregoing desirable property, the fluorinated ether liquid coolant is completely chemically inert and has a very high dielectric constant; that is, it is substantially electrically nonconductive. Further, the boiling point is approximately 381° F. and its freeing or pour point is −130° F.

Figure 3:
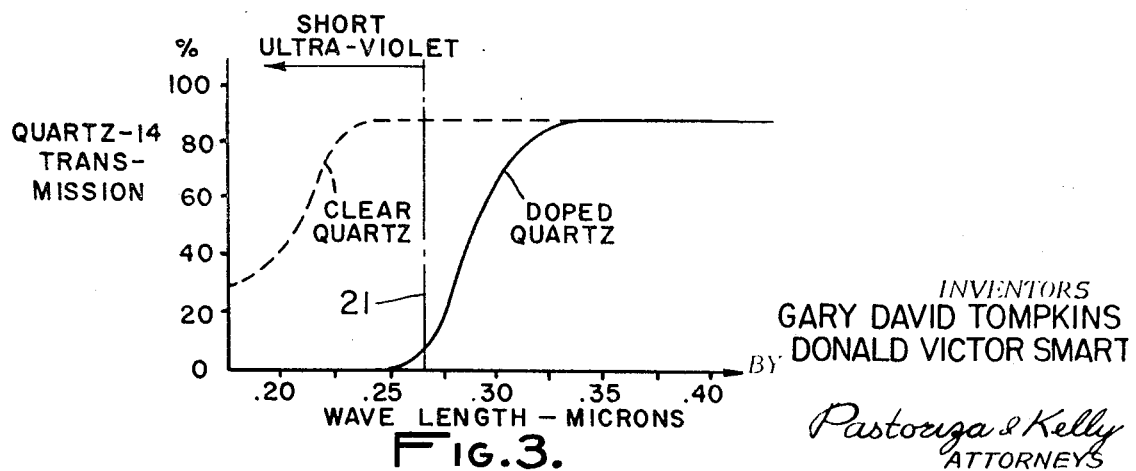

In order to avoid deterioration of the special liquid coolant, the quart envelope 14 for the light pump lamp is especially designated to be opaque to short ultraviolet radiation. Such radiation present in the laser head during laser operation has a very detrimental effect on most coolants available. FIG. 3 depicts the transmission characteristics of the special quart envelope 14 in the laser head of FIG. 1. The conventional type of lamp envelope in the form of clear quart has a transmission characteristic depicted by the dashed line wherein it will be evident that there is a relatively high transmission for short ultraviolet in the range of from approximately 0.23 microns to 0.25 microns. This special band is to the left of the vertical dashed line 21.

The specially designed envelope 14 has a transmission characteristic depicted by the solid line. This envelope comprises titanium-doped quartz and it will be noted that there is substantially zero transmission for the short ultraviolet radiation to the left of the line 21.

By utilizing the combination of the special liquid coolant and specially designed envelope, a greatly improved laser cooling system results.

OPERATION

In operation, the liquid coolant is circulated through the laser head interior by passing the same through the inlet passage 17 and out the outlet passages 18 and 19 as described heretofore. No special filters are necessary since the coolant is chemically inert.

Because the coolant itself is electrically nonconductive, the entire light pump lamp including the electrodes therefore may be immersed directly in the fluid. There is no necessity for shielding the electrodes and as a result a very compact laser head design is possible. This compact design has the advantage of enabling a closer spacing between the lamp and rod thereby improving the light coupling. This improved light coupling is in addition to that realizable because of the excellent optical coupling transmission characteristics of the coolant itself.

From the foregoing, it will be evident that the present invention has provided a greatly improved laser head cooling system wherein disadvantages heretofore associated with water or equivalent cooling media have been eliminated.

What is claimed is:

1. A laser head cooling system comprising, in combination:

a. a laser head having a hollow interior with inlet and outlet passages;

b. a laser material in said interior;
c. a light pump lamp in said interior including an envelope of material to render the envelope substantially opaque to short ultraviolet radiation so that said interior is free of such radiation during light pumping of said laser material; and,
d. a coolant comprising a fluorinated ether having an optical coupling transmission characteristic substantially greater than water for wavelengths of radiation longer than 0.80 microns, said coolant being circulated through said interior from said inlet to said outlet passages.

2. A system according to claim 1, in which said lamp is completely immersed in said coolant, said coolant having a boiling point of approximately 381° F. and being substantially chemically inert and electrically nonconducting, and in which said envelope is made of quart doped with titanium.

UNITED STATES PATENT OFFICE
CERTIFICATE OF CORRECTION

Patent No. 3,619,808          Dated November 9, 1971

Inventor(s) Gary David Tompkins and Donald Victor Smart

It is certified that error appears in the above-identified patent and that said Letters Patent are hereby corrected as shown below:

Col. 4, line 7

Delete "quart" and substitute --quartz--

Signed and sealed this 16th day of May 1972.

(SEAL)
Attest:

EDWARD M. FLETCHER, JR.          ROBERT GOTTSCHALK
Attesting Officer                Commissioner of Patents